W. ALLDERDICE.
Distance-Instrument.
No. 215,500.    Patented May 20, 1879.
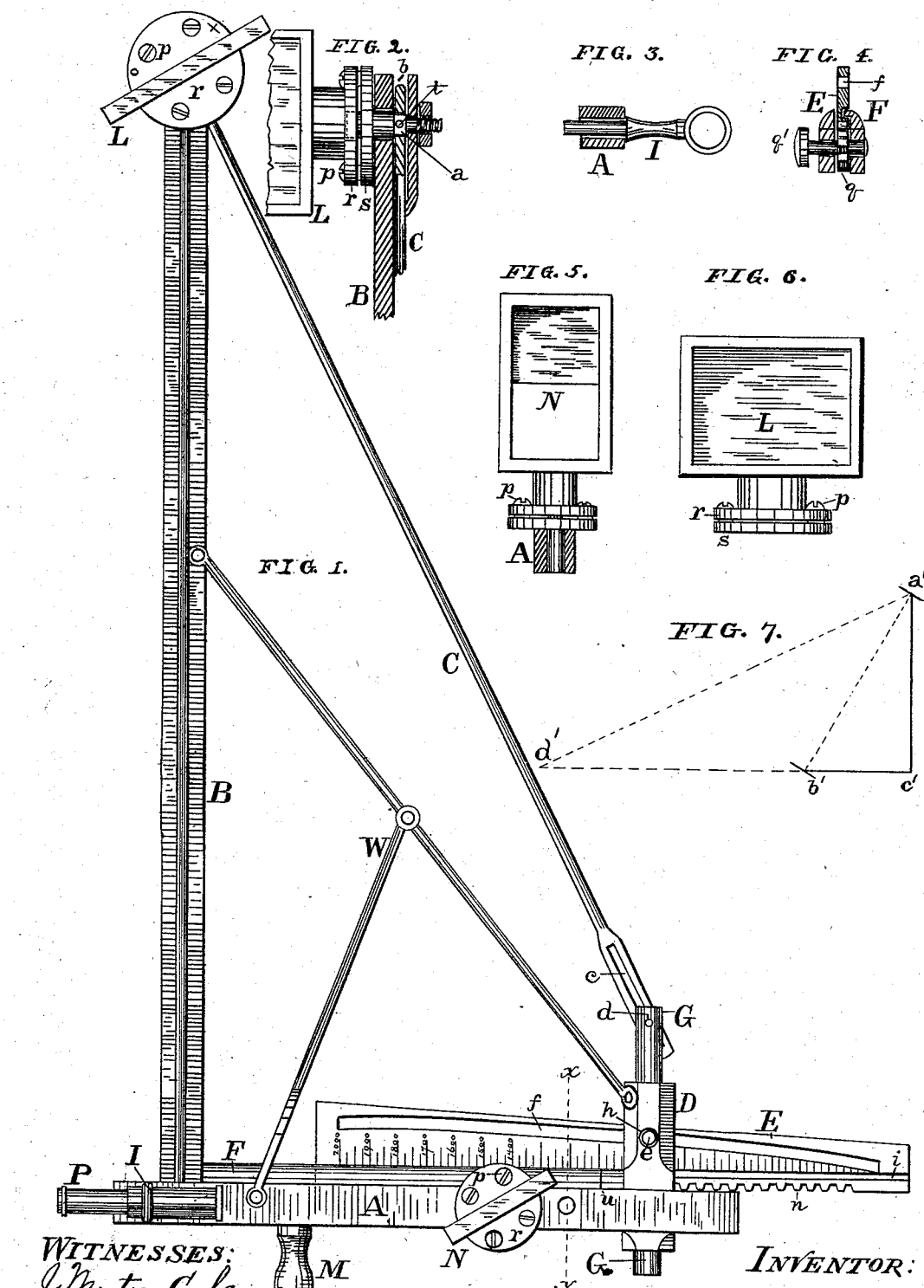
WITNESSES:
J. Morton Gale
A. E. Eader
INVENTOR:
Winslow Allderdice
By his Atty.
Chas. B. Mann

UNITED STATES PATENT OFFICE.

WINSLOW ALLDERDICE, OF UNITED STATES NAVY.

IMPROVEMENT IN DISTANCE-INSTRUMENTS.

Specification forming part of Letters Patent No. 215,500, dated May 20, 1879; application filed February 14, 1879.

*To all whom it may concern:*

Be it known that I, WINSLOW ALLDER-DICE, of the United States Navy, resident of Hagerstown, in the county of Washington and State of Maryland, have invented a new and useful Improvement in Instruments for Measuring Distances, of which the following is a specification.

My invention relates to an improvement in instruments for measuring distances within the limit of two thousand yards, and said instrument may be called a "range-finder." It is intended, primarily, for use in the military and naval services, particularly the latter, to ascertain the distance of a target or enemy, in order to give the guns the proper elevation. It may also be of use to surveyors in making running surveys.

In the accompanying drawings, Figure 1 is a side view of my instrument. Fig. 2 is a transverse view of the upper part, a portion of which is in section. Fig. 3 is a view of the telescope-support. Fig. 4 is a cross-section through $x$ $x$, Fig. 1. Fig. 5 is a view of the object-glass and connections. Fig. 6 is a view of the reflector. Fig. 7 is a diagram illustrative of the principle upon which my instrument operates.

A represents the base, on the upper surface of which are two guides, F, in which a graduated wedge, E, is adapted to slide. B is an upright, in practice twenty-six inches long, perpendicular to A, and having at its upper extremity a vertical slot, $b$. C is a rod or adjusting-lever, its upper end being inserted in the slot $b$ and rigidly attached to the bolt or rock-shaft $a$, which has its bearing in the upright transversely to the slot. The lower end of this lever has a slot, $c$, which is of exact uniform width.

D is a vertical guide, in the present instance in the form of a tube, rigidly connected with the base A. G is a rod, in the present instance cylindrical, and of size to fit in the guide or tube D, wherein it is adapted to slide endwise. Both this rod and guide are slotted to permit the wedge E to pass through, as shown in the drawings. The upper end of the rod is slotted, or may be otherwise adapted to receive the lower end of lever C, and a suitable pin, $d$, is passed through the rod and the slot $c$ in the lever, which latter it fits accurately, thereby permitting the pin to slide in the slot when the rod is raised by the wedge without any lost motion. Another pin, $e$, is passed through the rod G and the curved slot $f$ in the wedge, which latter it should fit accurately. This pin is inserted to its position through the hole $h$ in the guide or tube D, and the ends of the pin are flush with the surface of the rod.

The curved slot, $f$, cut in this wedge is parabolic, plotted mathematically. and of uniform width. Along one side of the wedge is a groove, $i$, cut to receive a corresponding tongue on one of the guide-plates shown in cross-section in Fig. 4. Upon the bottom edge of the wedge is a rack, $n$, into which a small pinion, $q$, gears, and is turned by a milled head, $q'$, located on the side opposite the telescope. Each side of the wedge is graduated, the one side to a scale of hundred yards—from one hundred to two thousand—and the other to a scale of yards from ten to four hundred. On each guide F, one-fourth of an inch from the tube D, is graven a black line, $u$, which is the index of the distance shown on the scale.

L is a mirror employed as a reflector, similar to the reflector of a sextant or octant, which is set at the head of the upright B, and is worked or adjusted by the rod C.

Referring to Figs. 2 and 6, the screws $p$ around the circular base $r$, to which the glass is rigidly connected, are for the purpose of adjusting the latter in the proper plane. The hole in the center of the circular base is to receive the head of the bolt $a$, by which it is attached to the instrument, as shown in Fig. 2. Near the head of and attached rigidly to the bolt is a disk, $s$, similar in dimensions to the base.

In practice that part of the bolt next to the disk is one-fourth of an inch in diameter; that part to which the lever C is attached is squared; the remaining part is round, having its bearing in the left side of the slot in the upright; its end projecting beyond is threaded and has a small tap. The connection of the lever with bolt is made rigid by means of the small screw $t$ in the end or side of the lever.

N is a glass, half of the surface whereof is silvered and half clear, similar to the object-glass of a sextant or octant. The means by which this glass is attached to the instrument is similar in construction to that described in connection with the reflector.

P is a small telescope similar to those used on a sextant or octant, and of most improved pattern, and is secured by the stud I, which is provided with a threaded ring, into which the telescope is screwed. W represents stays or braces to sustain the upright in its position rigidly.

The instrument is held by a wooden handle, M, fitted with a metal screw, by which it is attached to the under side of the base.

The diagram shown in Fig. 7 illustrates the primary mathematical principle upon which the instrument is constructed.

$b'$ $c'$ represent the base of the instrument. $a'$ $c'$ represent the upright. $b'$ represent the object-glass, adjusted so that the silvered part reflects from $c'$ to $a'$. $a'$ represents the reflector, whose plane is parallel to that of $b'$.

$d'$ represents an object the distance whereof from the observer is desired. With the eye at $c'$, looking through the clear part of the object-glass, the object $d'$ is seen. On the silvered part of the glass $b'$ is seen whatever is reflected in the glass $a'$. Then if $a'$ be turned on a pivot so as to reflect the object $d'$, the true object and reflected image will exactly coincide in the glass $b'$, which is the desired end; then tracing the dotted lines, we have the right triangle $a'$ $c'$ $d'$. Now, by plane trigonometry, in any right triangle where two parts are given the others may be found. In this triangle we have the side $c'$ $a'$ and the angle $a'$ $d'c'$, (which is twice the angle through which we turned the reflector,) from which the side $c'd'$, or the desired distance, can be found.

In the adaptation of this instrument to apply the above principle, the following are requisites: first, to measure accurately the angle through which the reflector is turned; second, to convert this angle into linear measure, so that it may be read off the scale in the latter. This latter end is accomplished by taking accurate measurements of the parts of the instrument, calculating the angles through which the reflector will have to move and the distance vertically through which the rod G will have to move in order to effect it, and then plot a curve (which has been found to be parabolic) every point of which coincides, when applied to the lever, with the base line of a triangle.

Owing to possible error which may arise on account of the slightest mechanical imperfection in the manufacture of the instrument, it is deemed advisable not to graduate the wedge by mere computation, but by actual test over accurately-measured distances plainly marked out.

The following is the method of using the instrument: Hold the instrument with the right hand in a vertical position; raise it to bring the telescope to the eye; with the left hand turn the milled head $q'$ until the true and reflected objects coincide at the point of division—i. e., where the silvering commences on the object-glass; then the mark on the graduated wedge that coincides with the index-line $u$ on the guide will be the distance of the object.

If a long distance is to be measured—such as for ranging guns—the points marked 0 on the reflector-base and its disk must be in coincidence, and the right side of the wedge read off.

If a short distance—such as surveying a plat of ground—the points marked + on the reflector-base and disk must be brought into coincidence and the left-hand side of the wedge read off.

To adjust the glasses, set the object-glass so that it reflects exactly upon the reflector. This is done by loosening the tap and turning it with the left hand, the eye being at the telescope; then tighten the tap and set it with the screws, and adjust the reflector with the set-screws so that when looking at an object and swinging the upper part of instrument around upon a pivot of which the base is the axis, the point of contact in the object-glass of the true and reflected object will be preserved.

I do not limit my claim to the precise arrangement herein shown, as each part of the instrument may be somewhat modified in its construction and still effect the same result.

Having described my invention, I claim and desire to secure by United States Letters Patent—

1. The combination, with the base and upright of an instrument for measuring distances, of an adjusting lever or rod having its upper end so connected that its movement will shift a reflector, and its lower end connected to a movable piece which is adapted to be actuated by a movable graduated wedge, substantially as set forth.

2. In an instrument for measuring distances having a base and an upright, a reflector attached to a rock-shaft at the upper extremity of upright, and adapted to be shifted by a lever or rod the lower end whereof is actuated by a movable graduated wedge, and an object-glass half of the surface of which is a mirror and half clear, and attached to the base, substantially as set forth.

3. In an instrument for measuring distances having a reflector attached at its uppermost part and an object-glass attached at its base, the combination of a lever or rod having one end attached to the reflector and the other to a vertically-moving rod which is actuated by a graduated wedge adapted to be moved by the hand, as set forth.

4. In an instrument for measuring distances, the combination of a reflector adjusted by a lever or rod the lower end of which is actuated by a graduated wedge provided on its bottom edge with a rack and a pinion to gear with the rack, as set forth.

5. The combination, in an instrument for measuring distances, of a graduated wedge adapted to be moved in a horizontal guide, and having a parabolic slot in which a pin fits that is attached to a vertically-moving rod, as set forth.

6. The reflector L, rigidly secured to circular base $r$, which is provided with the adjusting-screws $p$, and the bolt or rock-shaft $a$, having the disk $s$ attached, as and for the purpose specified.

WINSLOW ALLDERDICE,
*Ensign U. S. N.*

Witnesses:
ROBERT N. CLAGGETT,
W. D. RECHER.